(No Model.)

W. F. RUSSELL.
MANUFACTURE OF ORNAMENTAL GLASSWARE.

No. 292,765. Patented Jan. 29, 1884.

Witnesses:
C. S. Parker
R. H. Whittlesey

Inventor: William F. Russell
By Attorney: George H. Christy

UNITED STATES PATENT OFFICE.

WILLIAM F. RUSSELL, OF WHEELING, WEST VIRGINIA, ASSIGNOR TO HOBBS, BROCKUNIER & CO., OF SAME PLACE.

MANUFACTURE OF ORNAMENTAL GLASSWARE.

SPECIFICATION forming part of Letters Patent No. 292,765, dated January 29, 1884.

Application filed February 26, 1883. (No model.)

*To all whom it may concern:*

Be it known that I, WILLIAM F. RUSSELL, of Wheeling, county of Ohio, State of West Virginia, have invented or discovered a new and useful Improvement in the Manufacture of Ornamented Glassware; and I do hereby declare the following to be a full, clear, concise, and exact description thereof, reference being had to the accompanying drawings, making a part of this specification, in which—like letters indicating like parts—

Figure 6:
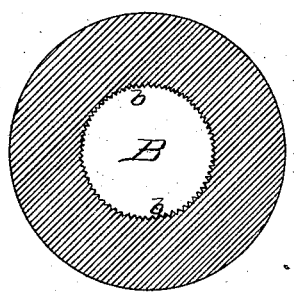
Figure 7:
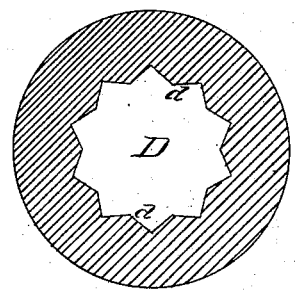

Figures 1, 2, 3, 4, and 5 are views of a partially blown or formed article of glassware illustrative of results secured at different steps or stages of my improved process. Figs. 6 and 7 are transverse sectional views of corrugated, fluted, or ribbed mold-cavities illustrative of means adapted for use in working my invention.

My invention relates to the art of forming ornamental designs or configurations on the surfaces of hollow articles of glassware; and in general terms it consists in forming ribs or corrugations in two or more different directions on the surface of the partially-formed article, and then finishing the article, as hereinafter more fully described and claimed.

Figure 4:
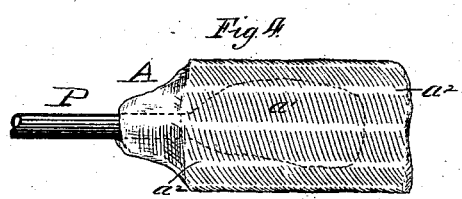

The purpose of my invention is to give the exterior surface of hollow articles of glassware a ribbed or fluted form and appearance—for example, such as is illustrated in Fig. 4, having ribs, flutes, or corrugations running in both circumferential and longitudinal directions.

Figure 1:
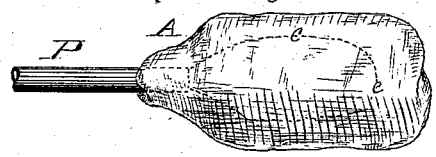
Figure 2:
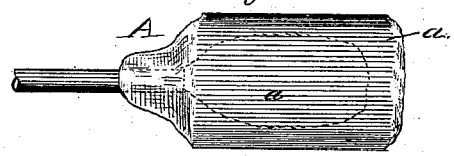
Figure 3:
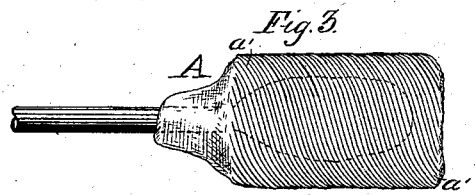

In forming a design or configuration of this character a quantity of hot plastic glass, A, Fig. 1, suitable for forming the desired article, is gathered on the end of the blower's pipe P, and, by preference, is blown into, forming a bubble of air, indicated by dotted lines $c$, more or less large, according to the size of the piece of ware to be made. While still very hot and attached to the blow-pipe this partially-formed article A is pushed down by the workman into the cavity of a mold, B, Fig. 6, the side wall of which is corrugated with longitudinal ribs or flutes $b$, of any desired size and number, the depth and diameter of the cavity being such as to admit that part of the article A which is to be ribbed or fluted. By pressing the glass A into this mold-cavity, and, if desired, expanding it somewhat by blowing through the pipe, ribs, flutes, or corrugations $a$ (see Fig. 2) will be formed on its exterior surface corresponding to those on the mold-wall. The blank is then removed from the mold and quickly inserted in the cavity of another mold, D, Fig. 7, having on its side wall longitudinal ribs or corrugations $d$, of any desired number and size, but by preference less in number and larger in size than the ribs $b$ of the first mold; also, the diameter or size of this cavity is somewhat greater than that of mold B, so as to receive the article readily and permit the workman to twirl or turn it around within the cavity, and thus give the corrugations or flutes more or less of a spiral inclination or circumferential curve around the article, as at $a$, Fig. 3. This spiral course of the ribs may be more or less inclined from their original direction, as may be desired, by varying the amount of twirling imparted to the article. When the desired inclination has been secured, the article is pushed down in the mold D, whereby a new or second set of longitudinal corrugations bounded or indicated by the lines $a^2$, Fig. 4, are formed or impressed upon and across the spirally-formed ribs $a'$. The partially-blown glass is then removed from mold D, and the operation of blowing and shaping is completed with or without the aid of a shaping-mold, and by any of the methods and appliances known or practiced in the art, the impressions made on the exterior surfaces being retained in such subsequent shaping. Any desired article of glassware may be made in this manner—as celery-glasses, goblets, pitchers, vases, &c., and a highly ornamental and attractive appearance be imparted to their exterior surfaces calculated to increase materially the demand for and sale of such goods.

This operation of forming longitudinal flutes or ribs, twisting them spirally or circumferentially around the body of the glass, and then imprinting or forming another set of ribs or corrugations upon or over the previously-formed set or sets may be repeated any desired number of times upon the partially-formed article, and in doing so any desired number and size of ribs or corrugations may be made at successive steps, either equal or variable, for example.

Figure 5:
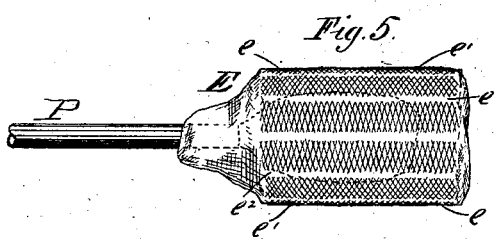

In Fig. 5 I have illustrated a partially-blown article, E, having two sets of spirally-inclined flutes or ribs $e$ and $e'$ of substantially the same size, with a third set of longitudinal corrugations of larger size bounded by the lines $e^2$. These several sets of corrugations are formed substantially as before described—that is, the first, $e$, are formed straight, like the corrugations $a$, then twisted or spirally inclined in a larger mold, as described with reference to the ribs $a'$; but in the present case the corrugations of this larger mold correspond in number and size to the second set, $e'$, of corrugations, which are formed straight in this second or intermediate mold by pushing the hot glass down in the mold, after which the article is transferred to a mold like the mold D, in which it is first twirled to twist the second set of ribs in direction opposite to the first set, and then pushed down in the mold to form the third set of impressions, $e^2$, substantially as described with reference to the corrugations $a^2$.

A variety of forms and designs may be made in this manner, which, possessing similarity or likeness in general appearance, will still have such differences in details of form as to impart a color of individuality to separate pieces of sets or to separate sets, thereby obtaining artistic effects not otherwise obtainable. I do not, however, claim herein designs formed in this manner, as the same, considered as designs, form the subject-matter of Design Patent No. 13,645, granted to me February 20, 1883. Neither do I claim, alone considered, the formation of spiral or circumferential ribs on an article of glassware, my invention having reference rather to the formation of two or more sets of flutes, ribs, or corrugations imposed or impressed one upon another in different directions.

The method of operation above described by which such results are secured can be easily practiced by persons skilled in the art of glass-blowing, and will be found to be a material and valuable improvement in such art.

Instead of the corrugated mold-cavities B D shown and described, other forms of corrugated surfaces may be employed for impressing the desired ribs or flutes upon the surface of the glass, and, if desired, these ribs or flutes may be more or less spirally inclined by the impression of such surfaces, and these and similar modifications in carrying out the process I consider as coming within my invention.

I claim herein as my invention—

1. The method herein described of ornamenting the exterior surface of glassware in the operation of forming the same, consisting of pressing the hot plastic glass of which the article is to be formed upon a ribbed or corrugated surface, twisting or bending the ribs or flutes thus formed in inclined or circumferential directions around the body of glass, and again pressing the glass upon a ribbed or corrugated surface, to impart a second set of ribs or flutes upon and across the first, substantially as set forth.

2. The method herein described of forming ornamented articles of glassware, consisting in first gathering the glass upon a blower's pipe; second, pressing such glass while attached to the pipe upon a corrugated wall or surface; third, bending or twisting the ribs thus made on the body of glass; fourth, again pressing the glass upon a corrugated wall or surface forming a second set of ribs crossing the former ones, and then blowing and shaping the glass thus ribbed into the desired article, substantially as set forth.

3. The method herein described of ornamenting articles of glassware, consisting in forming upon the exterior surface of the partially-formed article inclined ribs, flutes, or corrugations, then pressing or imprinting upon such ribbed surface a second set of ribs, flutes, or corrugations, crossing those first formed, and finally shaping the glass thus impressed into the desired article, substantially as set forth.

4. The method herein described of ornamenting articles of glassware, consisting in forming upon the exterior surface of the glass one or more sets of ribs, flutes, or corrugations, the different sets being impressed or formed one upon another and inclined around the body of glass in different directions, then impressing another and larger set of corrugations upon and across those previously made, and finally shaping the glass thus impressed into the desired article, substantially as set forth.

5. The method herein described of ornamenting glassware, consisting in forming two or more sets of ribs or corrugations on the exterior surface of the glass article, one set being impressed upon and across another, substantially as set forth.

In testimony whereof I have hereunto set my hand.

WILLIAM F. RUSSELL.

Witnesses:
CHAS. F. BIRCH,
J. F. THOMPSON.